July 31, 1923.

T. C. LEAKE

TRACTOR

Filed Aug. 4, 1919

WITNESS
H. A. Sherburne.

INVENTOR
T. C. LEAKE
BY
White & Prost
ATTORNEYS

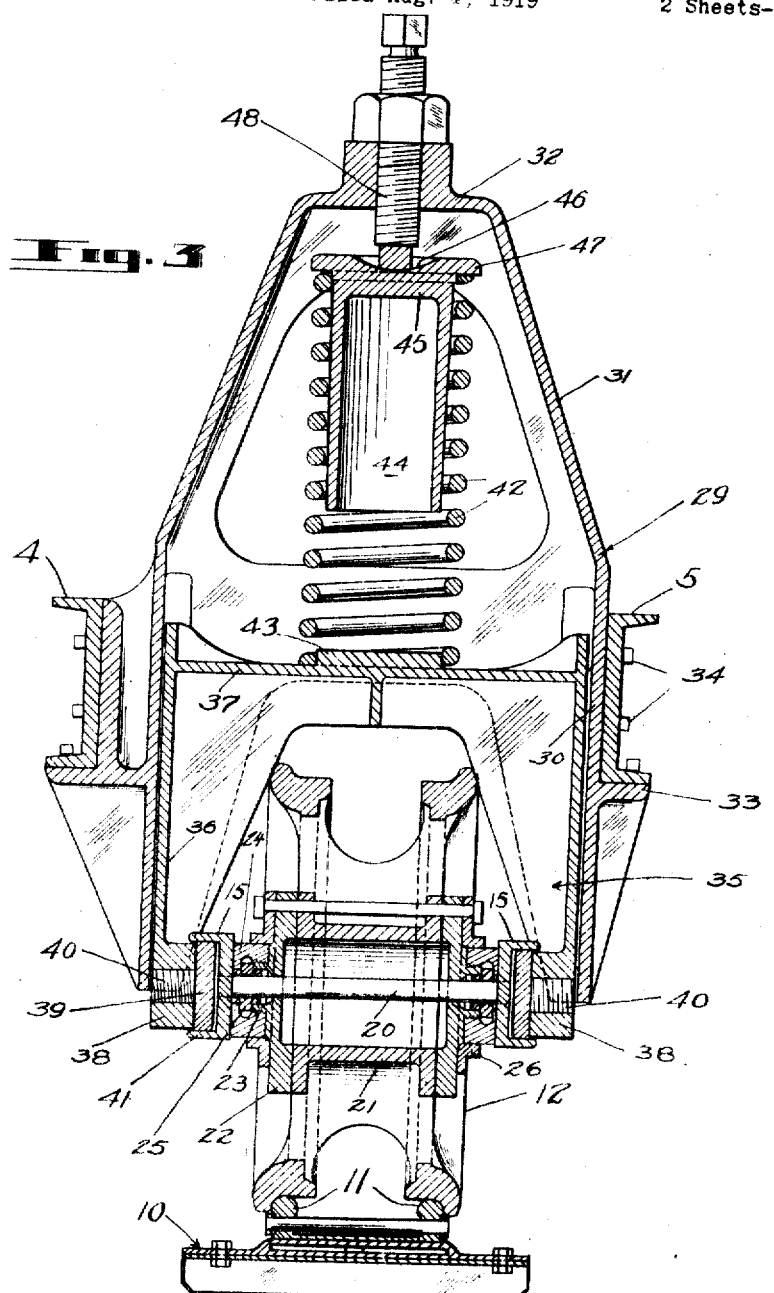

Patented July 31, 1923.

1,463,366

UNITED STATES PATENT OFFICE.

THOMAS C. LEAKE, OF SAN FRANCISCO, CALIFORNIA.

TRACTOR.

Application filed August 4, 1919. Serial No. 315,050.

*To all whom it may concern:*

Be it known that I, THOMAS C. LEAKE, a citizen of the United States, and a resident of the city and county of San Francisco and State of California, have invented a new and useful Tractor, of which the following is a specification.

This invention relates to improvements in tractors and more particularly to tread mechanisms for tractors of the track laying or caterpillar type.

An object of the invention is to provide a tractor tread which is constructed so that the maximum and highly effective traction action may be obtained at all times regardless of the character of the ground over which the tread passes.

Another object of the invention is to provide tread mechanism of the above type which when passing over ground irregularities will readily conform thereto, closely engage therewith and distribute such strains or stresses which occur incident to encountering said irregularities, so that the tractive action is as great and as effective at one point of that portion of the tread which engages the ground as it is at any other point of such portion of the tread, thus providing for relatively greater traction and tractor efficiency than can be had with the ordinary tractor.

A further object of the invention is to provide a tread of the character described which is of relatively simple construction, consists of few parts and is inexpensive to manufacture.

The invention possesses other features of advantage, some of which, with the foregoing, will be set forth at length in the following description, where I shall outline in full, that form of the invention which I have selected for illustration in the drawings accompanying and forming part of the present specification. In said drawings I have shown one form of the device of my invention, but it is to be understood that I do not limit myself to such form, since the invention, as expressed in the claims may be embodied in a plurality of other forms.

Referring to the drawings:

Figure 3 is a vertical sectional view taken on line 3—3 of Figure 1, showing detail of construction of the invention.

Figure 1:
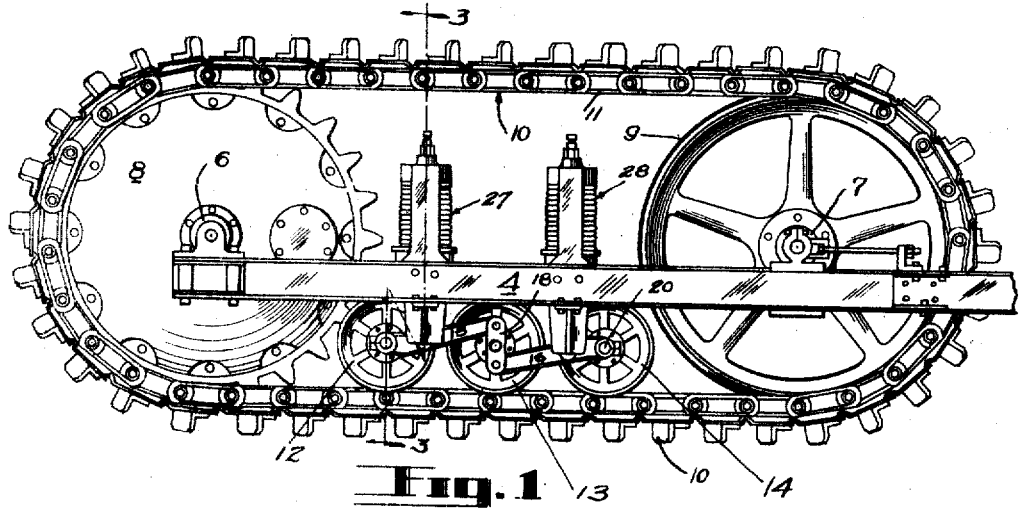
Figure 1 is a side elevation of tractor tread mechanism constructed in accordance with my invention.
Figure 2:
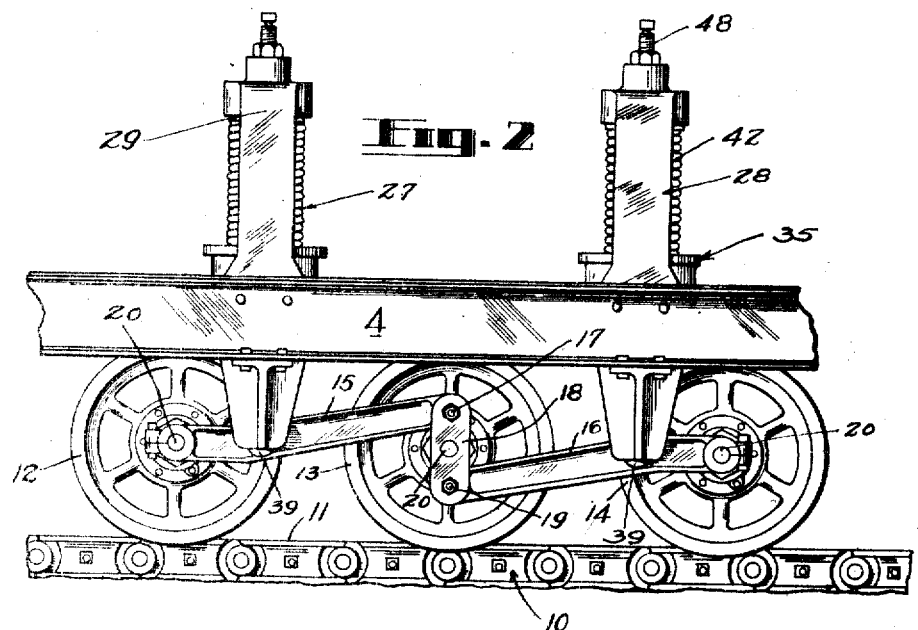
Figure 2 is an enlarged fragmentary side elevation of the tread mechanism, shown more in detail.

The tractor of my invention is provided with an endless tread, supported and operated by tractor drive and supporting wheels. I provide tread pressure compensating means which principally comprises rollers arranged to yieldingly bear upon that portion of the tread which engages the ground. Each roller is so connected with the other of the rollers and with the tractor frame so that as pressure from the tread is brought to bear directly on one roller incident to the encountering of a ground irregularity and the tread being forced to yield, such pressure or the load will be distributed to the other rollers equally and force them to bear under such pressure upon the tread. Thus the tread will be forced into close contact with the ground throughout that portion which engages the ground and the tractive effort will be as great and as effective at one point of tread as at the other.

I have illustrated only such portions of a tractor as are necessary to show the association of the tread mechanism of my invention with the tractor. Mounted on each side of the tractor frame bars 4 and 5 upon axles 6 and 7 are toothed drive wheels 8 and tractor supporting wheels 9. Mounted on the wheels 8 and 9 on each side of the tractor is an endless belt tread element 10 of the ordinary construction except that endless tracks 11 are carried on the inner side of the tread. Disposed between the wheels 8 and 9 along the lower run of the tread is means for compensating tread strains or pressures, distributing said pressures throughout that portion of the tread engaged with the ground between the wheels and for causing the tread to accommodate and conform itself to ground irregularities.

This means in the present embodiment of the invention comprises members 12, 13 and 14 which engage the tread and are so connected to one another and the tractor frame that relative vertical movement thereof is permitted but movement of one of said members causes the other of such members to bear upon and force the tread into engagement with the ground. The members 12, 13 and 14 are preferably in the form of rollers which ride upon the tracks 11 on the inner face of the tread and although I show three rollers, any number may be used as desired.

As a means for connecting the rollers to one another and for attaching them to the frame there are provided supporting bars or levers 15 and 16 arranged in pairs, there being a pair 15 and a pair 16. These levers 15 and 16 are pivotally and vertically adjustably connected with the frame as will be later more fully described.

Between the levers 15 at certain ends thereof the roller 12 is mounted, and the other ends of the levers are pivoted as at 17 to the upper ends of links 18. The links support the roller 13 intermediate of their ends and at their lower ends are pivoted as at 19 to certain ends of the levers 16. The other ends of the levers 16 support the roller 14 between them.

The rollers 12, 13 and 14 are mounted on spindles 20 which latter are supported by the levers 15 and 16 with the exception of the spindle for the roller 13, this spindle being carried by the links 18. These spindles extend through the hubs 21 of the rollers, the openings through the hubs being of considerably greater diameter than the spindles so as to provide oil chambers. Removably secured to the hubs 21 are hub plates 22 through which the spindles extend and which close the openings through the hubs. The hub plates 22 are provided with apertured externally screw threaded nipples 23 upon which are turned the octagonal nuts 24. These nuts abut the opposed faces of the hub plates and levers and house the bearing sleeves 25. Lock nuts 26 are slipped over the octagonal nuts and secured to the hub plates 22. Thus it will be seen that the rollers can be quickly and easily attached or detached relative to the levers 15 and 16 and links 18.

There are provided spring devices 27 and 28 for vertically adjustably, and yieldingly connecting the rollers 12, 13 and 14 to the tractor frame bars 4 and 5. Each of these spring devices is pivotally connected with the levers, the one 27 being pivoted to the levers 15 and the device 28 being likewise connected with the levers 16, both at points intermediate the ends of the levers.

The devices 27 and 28 are identical as to construction and each comprises a skeleton frame or housing 29, having its body portion provided with parallel walls 30 which are upwardly and inwardly inclined as at 31 from the body portion and are joined at their upper ends by a wall 32. The opposite sides of the housing are provided with flanges 33 which engage under and are secured to the frame bars 4 and 5. The housings are disposed between the bars 4 and 5 in engagement therewith and are secured by bolts 34.

Mounted for vertical sliding movement within each housing is a supporting member 35 in the form of a skeleton casting and having opposed side walls 36 joined by a top wall 37. The side walls are reduced at their lower ends and at such points are provided with inwardly extending screw threaded bosses 38. Mounted in the bosses are bearing members 39 which are provided with screw threaded extensions 40 that are turned in the screw threaded bosses. These bearing members are disposed between and in engagement with the flanges 41 of the levers 15 and 16, said levers being channeled, and said bearing members are preferably circular so as to permit free pivotal movement of the levers.

The walls 36 of the casting 35 are parallel to the walls 30 of the housing 29 and may slidably engage therewith so that the casting will fit snugly in the housing and be held securely in place. Mounted between the upper ends of the housing 29 and casting 35 is an expansion spring 42 which yieldingly holds the casting 35 in such position that the rollers are held in yielding engagement with the tread 10.

A boss 43 is formed on the walls 37 of the casting and the lower end of the spring 42 receives said boss. A tubular spring holding member 44 is extended into the upper end of the spring. The upper end of the member 44 is closed by a wall which is formed with a central concavity 46 in its upper face. An annular flange 47 on the upper end of the member 44 rests upon the upper end of the spring and holds the spring and member 44 in the proper relative position. A bearing screw 48 adjustably mounted in the wall 32 of the housing 29 engages in the concavity 46 of the wall 45. By adjusting the screw 48 the tension of the spring 42 may be varied as desired.

The levers 15 and 16 are angular. They are straight adjacent the ends thereof on which are carried the rollers 12 and 14 and the remaining portions extend angularly from said ends. The connections between the levers and the springs are so placed that an upward thrust on any supporting roller is transmitted to the other rollers, so that all of the rollers bear against the track with equal pressure. The levers act as compensating means to distribute the load equally over the three sets of rollers. The spring is connected to the lever at such point that one-third of the lever lies between the spring and the end roller and two-thirds of the lever lies between the spring and the link 18 at the middle roller.

When the tread 10 encounters an irregularity in the ground, for example, under the roller 12, the tread and roller will yield upwardly against the action of the spring device 27 and the weight of the tractor. The ends of the levers 15 to which the roller 12 is attached will be forced upwardly and opposite ends of the levers will be forced downwardly, the pivotal connection of the levers with the spring device 27 being the fulcrum for the levers. This will force the roller 13 on the links 18 to bear downwardly on the tread. The links are rocked so that the lower ends thereof will, in this instance, be moved arcuately to the left, and such movement of the links causes the lever 16 to rock on their pivotal connections with the device 28 and to force the roller 14 downwardly upon the tread. Thus it will be seen that when any of the rollers is caused to yield by the action of the tread incident to its being run over rough uneven grounds, the action of compensating the load or pressure by delivering such load to each and all of the rollers is readily provided by the system of levers and links. In this way practically a 100% traction action is provided at all times inasmuch as the tractive effort is as great and as effective at one point of the portion of the tread engaged with the ground as it is at any point of such portion of the tread, regardless of the roughness and unevenness of the ground.

I claim:

1. A tractor comprising a frame, wheels mounted on the frame, an endless flexible track engaging the wheels, members vertically and yieldably connected with the frame, a link, levers pivoted intermediate their ends to the members and at certain ends to said link, and rollers carried by the link and the free ends of the levers and engaging the tread between the wheels.

2. A tractor comprising a frame, wheels mounted on the frame, an endless track engaging the wheels, housings on the frame, blocks slidably mounted in the housings, compression springs interposed between the housings and blocks, levers pivoted intermediate their ends to the blocks, links pivotally connecting the levers, and rollers carried by the levers and links and engaging the endless track between the wheels.

3. A tractor comprising a frame, wheels mounted on said frame, an endless flexible track engaging the wheels, housings on said frame, blocks slidably mounted in said housings, compression springs interposed between the housings and the blocks, levers fulcrumed adjacent their outer ends on said blocks, rollers engaging the endless track mounted on the outer ends of said levers, means connecting the inner ends of said levers and a track engaging roller mounted on said connecting means.

4. In a tractor, a frame, an endless flexible track, a series of three rollers engaging said track, a lever yieldingly fulcrumed on the frame and connected at one end to a roller at one end of the series, a lever yieldingly fulcrumed on the frame and connected at one end to a roller at the other end of the series, and means connecting the other ends of the levers to the intermediate roller.

5. A tractor comprising a frame, wheels mounted on said frame, an endless flexible track engaging said wheels, a series of three rollers engaging the track intermediate said wheels, levers fulcrumed intermediate their ends to said frame and connected at their outer ends to the outer rollers of the series and at their inner ends to the intermediate roller and springs interposed between the fulcrums of the levers and said frame.

6. In a tractor, a frame, an endless flexible track mounted on said frame, a series of three rollers engaging said track, a lever on the forward end of which one roller is mounted, a second lever on the rear end of which another roller is mounted, means on which the third roller is mounted connecting the other ends of the levers, blocks in which said levers are fulcrumed, means on the frame for guiding the movement of said blocks and springs interposed between the blocks and the frame.

In testimony whereof, I have hereunto set my hand at New York city, this 14th day of July, 1919.

THOMAS C. LEAKE.

In presence of—
ELSIE C. DUFF.